US010583401B2

(12) United States Patent
Agnihotri

(10) Patent No.: US 10,583,401 B2
(45) Date of Patent: Mar. 10, 2020

(54) INTEGRATED ULTRAFILTRATION AND REVERSE OSMOSIS DESALINATION SYSTEMS

(71) Applicant: ADVANCED HYDRO INC, Pflugerville, TX (US)

(72) Inventor: Dileep Agnihotri, Round Rock, TX (US)

( * ) Notice: Subject to any disclaimer, the term of this patent is extended or adjusted under 35 U.S.C. 154(b) by 510 days.

(21) Appl. No.: 14/768,353

(22) PCT Filed: Feb. 15, 2014

(86) PCT No.: PCT/US2014/016636
§ 371 (c)(1),
(2) Date: Aug. 17, 2015

(87) PCT Pub. No.: WO2014/127313
PCT Pub. Date: Aug. 21, 2014

(65) Prior Publication Data
US 2015/0375174 A1    Dec. 31, 2015

Related U.S. Application Data

(60) Provisional application No. 61/765,571, filed on Feb. 15, 2013.

(51) Int. Cl.
*B01D 61/02*        (2006.01)
*B01D 61/14*        (2006.01)
(Continued)

(52) U.S. Cl.
CPC .......... *B01D 65/02* (2013.01); *B01D 61/025* (2013.01); *B01D 61/145* (2013.01);
(Continued)

(58) Field of Classification Search
CPC .... B01D 65/02; B01D 61/022; B01D 61/025; B01D 61/027; B01D 61/04; B01D 61/145; B01D 61/147; B01D 61/422; B01D 61/44; B01D 61/48; B01D 61/58; B01D 2311/04; B01D 2311/06; B01D 2311/2619;
(Continued)

(56) References Cited

U.S. PATENT DOCUMENTS 4,219,421 A * 8/1980 Knibbs .................. B01D 61/22
                                                                   210/108
4,885,247 A 12/1989 Datta
(Continued)

OTHER PUBLICATIONS

International Search Report for PCT/US2014/016636, Completed by the U.S. Patent and Trademark Office on Apr. 25, 2014, 3 Pages.

*Primary Examiner* — Benjamin L Lebron

(57) ABSTRACT

An open architecture desalination system having a field of water desalination using porous micro filtration or ultrafiltration (MF or UF) membranes followed by high pressure reverse osmosis (RO) membranes for salt removal. A novel integrated system with a unique process flow allowing use of multiple UF and MF membrane configurations on same platform is also disclosed. Additionally, the system utilizes a noble process flow to enable high efficiency operation of the MF and UF membranes thus reducing footprint, longer life of the membranes and reduced energy.

7 Claims, 3 Drawing Sheets
(3 of 3 Drawing Sheet(s) Filed in Color)

A process flow for the open-architecture system with two hydraulically connected buffer storage tanks to manage – i) storage of MF/UF product, ii) storage of brine for back-flush of UF/MF membranes, iii) brine tank as common tank for CIP of both UF/MF and RO segments, iv) use of several valves for control of the operation of several types of membranes without requiring any changes to the piping. The feed is entered from bottom and permeate is extracted from top, irrespective of the membrane type.

(51) Int. Cl.
*B01D 61/58* (2006.01)
*B01D 65/02* (2006.01)
*C02F 1/38* (2006.01)
*C02F 1/44* (2006.01)
*C02F 9/00* (2006.01)
*B01D 35/30* (2006.01)
*C02F 103/08* (2006.01)

(52) U.S. Cl.
CPC ............ *B01D 61/147* (2013.01); *B01D 61/58* (2013.01); *C02F 1/38* (2013.01); *C02F 1/441* (2013.01); *C02F 1/444* (2013.01); *C02F 9/00* (2013.01); *B01D 35/30* (2013.01); *B01D 2311/2676* (2013.01); *B01D 2317/08* (2013.01); *B01D 2321/04* (2013.01); *C02F 2103/08* (2013.01); *C02F 2303/16* (2013.01)

(58) Field of Classification Search
CPC .... B01D 2311/2676; B01D 2311/2626; B01D 2317/022; B01D 2317/04; B01D 2317/08; B01D 2321/04; B01D 35/30; C02F 1/28; C02F 1/283; C02F 1/32; C02F 1/38; C02F 1/44; C02F 1/441; C02F 1/442; C02F 1/444; C02F 1/4691; C02F 1/4693; C02F 1/4695; C02F 9/00; C02F 2103/04; C02F 2103/08; C02F 2303/16; C02F 2209/008; C02F 2209/05; C02F 2209/40

See application file for complete search history.

(56) References Cited

U.S. PATENT DOCUMENTS

| | | | |
|---|---|---|---|
| 6,120,688 A * | 9/2000 | Daly | B01D 61/04 210/100 |
| 7,115,199 B2 * | 10/2006 | Simonson | B01D 29/114 210/232 |
| 7,592,178 B2 | 9/2009 | Ding et al. | |
| 8,167,143 B2 | 5/2012 | Sirkar et al. | |
| 8,236,178 B2 | 8/2012 | Ruehr et al. | |
| 9,790,113 B2 * | 10/2017 | Cohen | B01D 61/12 |
| 2003/0155291 A1 * | 8/2003 | Simonson | B01D 29/114 210/323.2 |
| 2005/0139530 A1 * | 6/2005 | Heiss | C02F 9/00 210/85 |
| 2008/0164209 A1 | 7/2008 | Zacerkowny et al. | |
| 2009/0050565 A1 * | 2/2009 | Muralidhara | B01D 61/04 210/651 |
| 2009/0101583 A1 | 4/2009 | Perry | |
| 2011/0006018 A1 * | 1/2011 | Ben-Horin | B01D 29/35 210/806 |
| 2011/0046787 A1 * | 2/2011 | Booth | B01D 61/12 700/271 |
| 2011/0186512 A1 | 8/2011 | Bonnelye | |
| 2012/0048796 A1 * | 3/2012 | Burr | B01D 65/00 210/470 |
| 2012/0267315 A1 | 10/2012 | Soane et al. | |

* cited by examiner

FIGURE 1

| UF Module Selection | Inside -> Outside ☐ | Outside -> Inside ☑ | Cross Flow ☐ |
|---|---|---|---|
| Filtration Time | 30 minutes | 20 minutes | 20 minutes |
| Forward Flush Time | 50 seconds | 40 seconds | 35 seconds |
| Backwash Time | 45 seconds | 40 seconds | 35 seconds |
| Ratio of Backwash Cycles (BF1:BF2) | 1:3 | 1:3 | 1:1 |
| Air Compressor Delay Time | | 3 seconds | |
| Filtration Delay | | 3 seconds | |
| Forward Flush Pump Delay | | 3 seconds | |
| Backwash Pump Delay | | 3 seconds | |

*Figure 1 A configuration table in the process control software interface allowing selection of either inside-out, outside-in or cross-flow configuration for installed membranes. Each configuration type has its dependent/common operating parameters as shown in table here.*

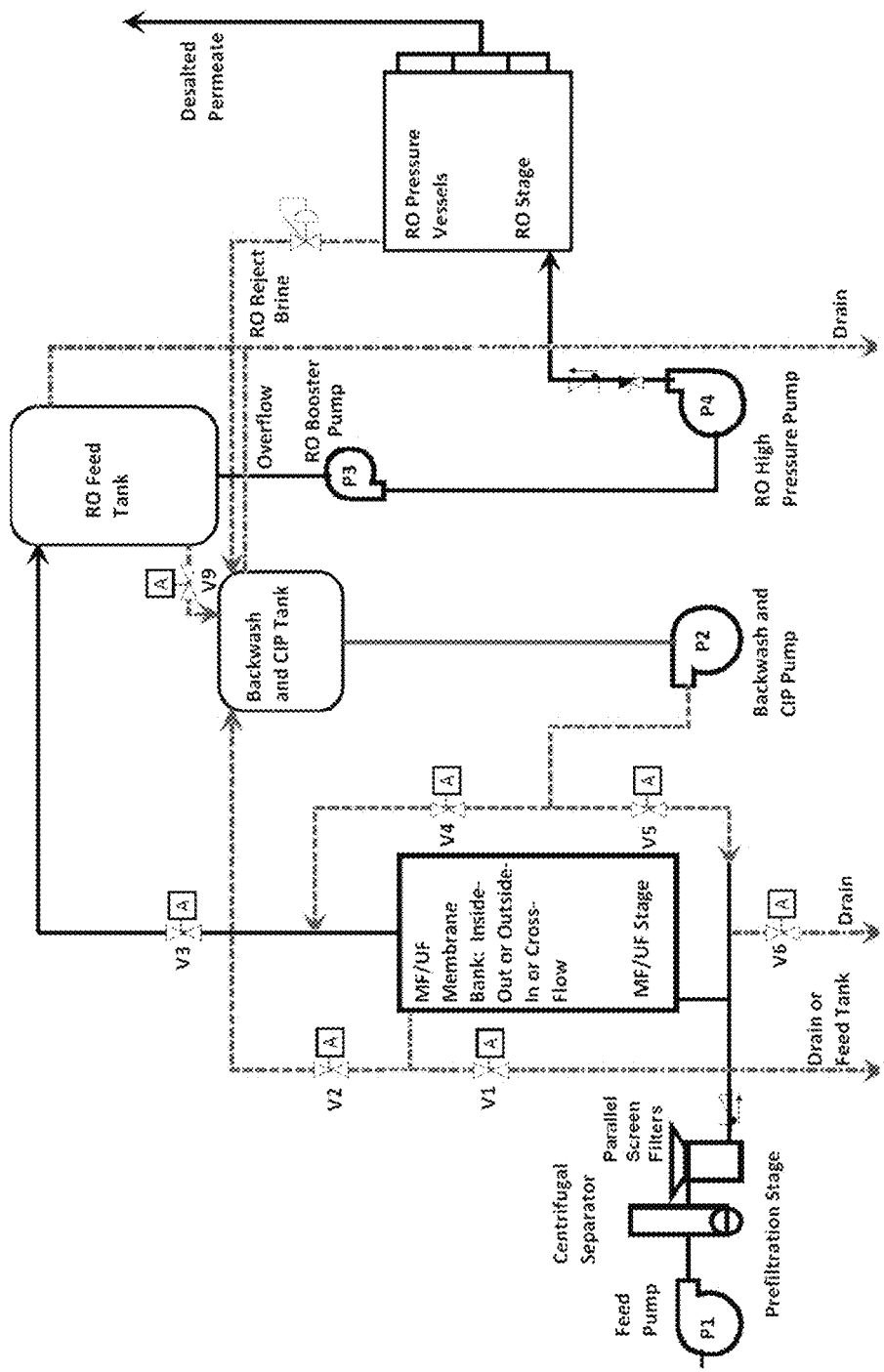

Figure 2: *A process flow for the open-architecture system with two hydraulically connected buffer storage tanks to manage – i) storage of MF/UF product, ii) storage of brine for back-flush of UF/MF membranes, iii) brine tank as common tank for CIP of both UF/MF and RO segments, iv) use of several valves for control of the operation of several types of membranes without requiring any changes to the piping. The feed is entered from bottom and permeate is extracted from top, irrespective of the membrane type.*

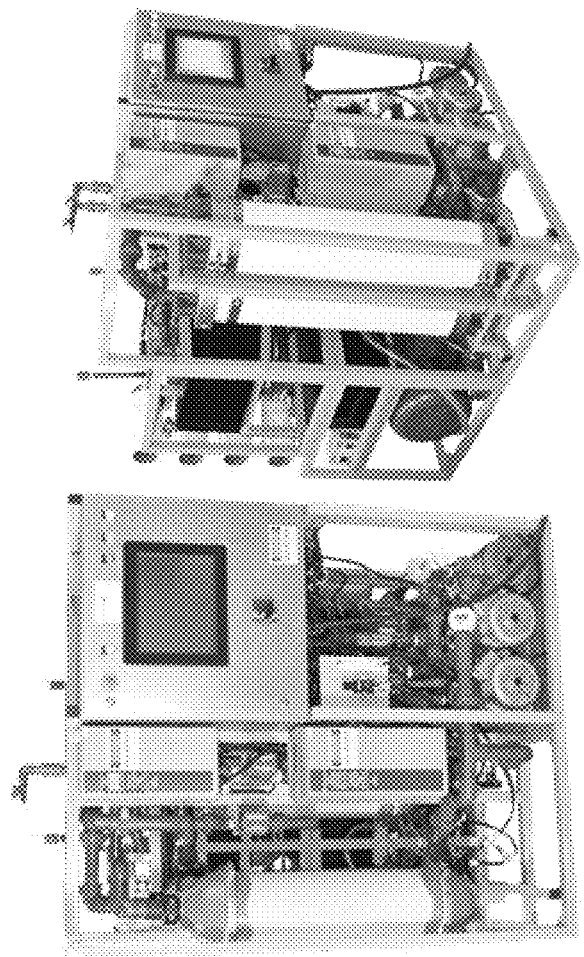
*Figure 3* A picture of the desalination system with open architecture that allows for a quick swap of inside-out UF/MF to outside-in UF/MF membranes without changes to main system piping or control program. The system also allows operation of integrated UF/RO process with built-in buffer tanks as shown in Figure 2 with a common PLC based control system.

INTEGRATED ULTRAFILTRATION AND REVERSE OSMOSIS DESALINATION SYSTEMS

CROSS-REFERENCE TO RELATED APPLICATION

This application is the U.S. national phase of PCT Application No. PCT/US2014/016636 filed on Feb. 15, 2014, which claims the benefit of U.S. Provisional Application No. 61/765,571 filed on Feb. 15, 2013, the disclosures of which are incorporated in their entirety by reference herein.

TECHNICAL FIELD OF THE INVENTION

The present invention relates in general to the field of water desalination using porous microfiltration or ultrafiltration (MF or UF) membranes followed by high pressure reverse osmosis membranes for salt removal. The invention focuses on a novel integrated system design that allows use of a wide range of UF and MF membranes available in the market, enabling an open architecture approach for membranes in the marketplace. The system uses unique process flow techniques that allow operation of multiple membrane configurations using a pre-programmed configuration matrix for their operational sequence needs. The system also utilizes a novel process flow to enable high efficiency operation of the MF and UF membranes harnessing the benefits of reduced footprint, longer life of the membranes and reduced energy.

BACKGROUND OF THE INVENTION

Without limiting the scope of the invention, its background is described in connection with systems for water purification, in particular, for desalination. The membranes are commonly used in purification of water whether it is surface water (rivers and lakes), or underground water (aquifers) or industrial and municipal wastewater (mining, metals, dyeing, chemical) or produced water from oil and gas extraction or salt removal from seawater or brackish water.

Membranes are very efficient and energy friendly for water purification applications. They are engineered and highly optimized to remove specific material from the feed effluent, for example, total dissolved solids (TDS) in form of mono and divalent ions such as NaCl, $MgSO_4$, $CaSO_4$, or other high molecular weight materials such as sugars, chemicals, organic molecules and other macromolecules. An RO membrane is optimized to reject Na+ Cl− ions for effective desalination while UF and MF membranes are designed to reject submicron particles or higher molecular weight impurities and remain permeable to dissolved salts.

Desalination is a combination step of several processes that remove excess salt and other impurities from water. After desalination, seawater, brackish water or surface water can be converted to fresh water suitable for human consumption and irrigation. Currently, more than 1,300 desalination plants are operational in the United States, producing over ½ billion gallons of water per day. Today's interests in desalination are focused on developing cost-effective ways to provide fresh water in the regions where availability of fresh water is, or is becoming limited.

During the last couple decades, membrane desalination and water treatment processes have developed very quickly, and most new facilities employ reverse osmosis (RO) technology. The RO process uses semi-permeable membranes and pressure to separate salts and other impurities from water. The membranes used for RO have a polymer matrix with a dense barrier layer where most separation occurs. They are able to treat water with varying salt and impurity concentrations over a wide range of 50 to 50,000 parts per million (ppm, also referred as milligrams per liter) of total dissolved solids (TDS). RO plants consume about 30 Watt-hours of electricity per gallon of (seawater) water desalinated or less depending on the salt content concentration. In most cases, the membrane is designed to allow only water to pass through this dense layer, while preventing the passage of solutes such as salt ions. These membranes are capable of removing up to 99.5% of salts, particulates, dissolved organics and emulsified oil. The process requires that a high pressure be exerted on the feed side of the membrane, usually 50-300 psi for surface and brackish water, and 500-1,000 psi for seawater, to overcome the osmotic pressure corresponding to the salt concentration. RO membrane systems typically use less energy than other desalination techniques such as thermal distillation, ion exchange, and electro-dialysis, and have led to a reduction in overall desalination costs over the past decade.

Today, including capital expenditure for desalination equipment when depreciated over time, operational expenditure for energy, membrane, cleaning chemicals, system maintenance and labor, costs for brackish water and seawater RO plants are approximately $1/1000 gallon and $3/1000 gallon product, respectively.

Continued efforts to reduce the cost of desalination have driven a large number of technological advances. These include evolution of advanced pre-treatment MF/UF membranes with wide range of materials and geometries. Hollow-fiber membranes (HFMs) have evolved as the geometry of choice due to their ease of cleaning and regeneration after fouling. Both inside-out and outside-in filtration geometries exist in HFMs. In addition to two geometries, several membrane material compositions such as PVDF, PAN and PES are also available. Due to large variations in geometries and materials, membrane manufacturers are able to lock in relatively high prices for proprietary designs and materials for fixed process flow equipment. Prices can vary significantly, anywhere from $3/$ft^2$ to $10/$ft^2$ of membrane surface area; however, performance differences are very limited. Membranes that are commonly available and can be produced by several companies tend to be lower in prices, while configurations and materials variations may still exist. End users generally get locked-in with a fixed system design and have limited flexibility to choose other membrane types during replacement cycles.

To address such limitations we have come up with a novel process flow and control strategy that allows an open architecture system with flexible pre-treatment UF/MF segment that can accept a variety of membranes from common suppliers including inside-out or outside-in geometries on same platform. The control system is able to accept several commercially available membranes in the market with minimal changes.

In an optimized desalination system, RO membranes are not allowed to be subjected to influent water that has high level of particulates. Measured using silt-density-index (SDI), the feed water must remain below 3 SDI. To achieve such low level of particulates, system manufactures provide one or two steps of microfiltration cartridges (say 30 um followed by 1 um) which are replaced frequently as they get clogged. In turbid waters that are usually found in coastal regions, these filters require frequent replacements and directly impact the performance and uptime of RO.

With access to more affordable MF and UF membranes, that can be backwashed frequently and regenerated periodically when fouled with suspended particles, and are able to last several years, the most cost effective desalination implementations involve use of advanced pre-treatment using MF and UF membranes as discussed above.

Unfortunately, due to complexity of MF and UF operation and maintenance, particularly related to their backwash, chemical regeneration, and periodic maintenance, systems developers usually offer them as individual components in the system. This significantly adds to the overall costs of the pretreatment since control system components are doubled (one for UF, one for RO), the labor to operate and maintain two separate system components is also doubled, and the resources required to build two separate control strategies and related software, middle interface adds to the cost and complexity of the system.

To reduce cost significant and simplify the operation of desalination with a UF/MF pretreatment, we developed an integrated UF/MF/RO system with single control system architecture while providing an operational scheme that further support open architecture on membranes and allow scaling of this approach from small scale skid mounted systems to mid- or large-scale commercial systems.

It would be very important to discuss some quantitative facts that the UF/MF filtration systems require periodic backwashes at high-flux rate, typically about 4-5 times (x) rate compared to the rate of normal filtration. Typically a UF/MF membranes will produce permeate for 20-30 minutes continuously at a pre-specified rate of filtration, followed by a 30 seconds to 1 minute of back-flush using filtrate water at about 4× the forward filtration rate. This results in overall production efficiency of the UF/RO component in the range of 80-85%.

It is worth noting that in a typical seawater desalination scenario, the overall efficiency of small-size (few thousand gallons per day) skid mounted RO systems is limited to about 30% while it can reach to 40% for mid-size (few hundred thousand gallons per day) systems. This means the overall productivity for a pretreatment UF/MF component must be sized to 2.5-4× the productivity of the RO component for a two stage desalination approach. For this scenario, any amount of improvement in overall UF/MF efficiency makes a significant impact on the footprint and the overall costs of the system. In addition, improved efficiency of UF/MF process allows operation of these membranes at reduced flux that further reduces the fouling on the membranes resulting in additional benefits for less cleaning and maintenance.

Using a novel process flow, we improve the overall efficiency for the UF/MF membranes to nearly 97% without any sacrifice in their performance. This is feasible with the integrated MF/UF/RO system architecture where we utilize the final reject water from RO (also called RO concentrated) for the back-flush of the UF/MF membranes.

Since all of the water going into RO subcomponent is already filtered through UF/MF subcomponent, it is clean of any particulates that may tend to foul the UF. During the RO pressurized separation, only TDS concentration is increased in the RO reject, thus it is not expected to cause UF/MF fouling during the back-flush. We generally have to only be careful with possible scaling from scalants present in the water and as long as pH is not in favor of scale producing conditions. In conditions, where scaling risk exists, during back-flush, small quantity of pH reducing acid can be injected. With nearly 10% increased productivity, it translates to nearly 25-40% reduction in the footprint of the pretreatment component in fully integrated UF/RO system.

In addition to UF/MF pretreatment, the presence of large suspended particles and heavy soil/metal, sand particles in the influent, commercial vendors will install additional filtration components such as disk-filtration, sock-filtration, screen filtration, etc. We implemented a novel two-step sequence of large-particulate filtration that combines a centrifugal filter followed by a removable screen filter to address both heavy and light floating greater particulates. Our strategy allow settling of heavy particulates before it enters a screen filter and light floating particulate to separate in screen filters. This combo strategy protects UF/MF membranes from abrasive particulates and allows very easy maintenance of screen filter. The combination strategy, never been shown before, significantly reduces the footprint required to clean water that meets the influent requirements of UF/MF membranes when compared to disk filtration or other screen filters.

SUMMARY OF THE INVENTION

An open architecture desalination system with following innovative features—

1) A sequential combination of centrifugal separator to remove heavy density particulate followed by a commonly used screen separator to remove low-density particulates larges than screen size. The screen separator uses parallel pair of screens with isolation valve to allow for in-process replacement of clogged screens.

2) A unique process flow for ultrafiltration separation segment where either inside-out or outside-in configuration hollow-fiber membranes can be installed while their operational process sequence is controlled by a simple configuration check-box in the control system, allowing use of wide range of ultrafiltration membrane modules. See FIGS. 1 and 2 for details.

3) Following the ultrafiltration, permeate is sent to an intermediate storage tank for use by the reverse-osmosis high pressure component, finally producing drinking quality water and a concentrate waste stream. The concentrate waste-stream is stored in another intermediate tank and subsequently used for back flush of the ultrafiltration membranes resulting in nearly 10-15% increase in the ultrafiltration production efficiency along with reduced footprint without any loss of performance. See FIGS. 1 and 2 for details.

4) An integrated process approach where the productivity requirements for the ultrafiltration is back-calculated by the reverse-osmosis performance, time between back-flushes, water productivity between the UF back-flushes and water consumed by the reverse-osmosis.

5) A membrane configuration dependent back-flush process selection, with two separate back-flush sequences and an option to select the frequency of each of the two back-flush process sequence. See FIG. 1 for details.

BRIEF DESCRIPTION OF THE DRAWINGS

The patent or application file contains at least one drawing executed in color. Copies of this patent or patent application publication with color drawling(s) will be provided by the Office upon request and payment of the necessary fee. A more complete and thorough understanding of the present embodiments and advantages thereof may be acquired by referring to the following description taken in conjunction with the accompanying drawings wherein:

FIG. 1: A configuration table in the process control software interface allowing selection of either inside-out, outside-in or cross-flow configuration for installed membranes. Each configuration type has its dependent/common operating parameters as shown in table. Once a configuration has been selected, a pre-programmed process moves water in a manner consistent to the requirements of a given membrane configuration. This table also defines a control parameter (BF1/BF2 backflush) which controls which type of backflush operation will be performed for certain type of membranes and it is configurable. In one case, membrane can be back flushed from top end (BF1) for 5 cycles and from bottom end (BF2) for 1 cycle. In other case it can be reversed and in a third case it can be an alternate cycle and other combination thereof, thus allowing efficient operation of each membrane in an open architecture equipment design without complicated programming requirements.

FIG. 2: A process flow layout of the open-architecture system with brine based back-flush of the UF/MF membranes and operation of various configuration options for UF/MF membranes. A feed pump (P1) sends water to UF/MF membranes from bottom end and the permeate from UF/MF is sent to a RO feed tank. This UF/MF treated permeate is boosted through a booster pump (P3) and further pressurized by pump (P4) for reverse osmosis process. The concentrate from RO is send to a temporary holding tank (Backwash and CIP tank) that is used for backwashing of the MF/UF section of the filtration. The RO feed tank capacity is designed to keep it running without interruptions when MF/UF section goes through periodic backflush process. Combination of 5 valves as shown in the FIG. allows for various combination necessary to do filtration, backflush, drain, forward-flush, clean-in-place for both MF/UF membranes as well as flush and clean-in-place for RO membranes.

FIG. 3: Two pictures of the same desalination system with open architecture that allows for a quick swap of inside-out UF/MF to outside-in UF/MF membranes with minimal efforts. The system also allows operation of the integrated UF/RO process with built-in buffer tanks as shown in FIG. 2 with a common PLC based control system. This approach allows significant reduction in foot-print for same capacity and eliminates dependence on one type of membrane use, a key component of the invention.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of distinct ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

A membrane is a permeable, often porous material in the form of a film, a tube, a powder or a block and capable of filtering certain material while blocking others. The pores or thin layer of the membrane defines its unique characteristics for serving as a selective barrier. Membranes are widely used in purification of gases and liquids. They are highly energy efficient; however they generally require a pressure differential to work. Advanced purification of water today mostly uses membranes. Based on their pore size, membranes are classified as reverse osmosis (RO), nano-filtration (NF), ultra-filtration (UF) and micro-filtration (MF). While all of these membranes are permeable to water, they reject certain size impurities while allowing water to go through them.

Generally, for filtration through MF and UF membranes, the influent water must be clarified to remove particulates larger than 150 um in size and high density particulates should also be removed to minimize the abrasion damage of the active separation layers. In one embodiment of the invention, we disclose a combo, sequential implementation of a centrifugal separator followed by a screen filtration providing the desired water quality prior to MF and UF stage. This sequential combination step significantly reduces the footprint utilized by other methods such as disk-filtration or use of single step screen or sock filtration.

The screen and sock filtration generally require frequent replacement of screen/sock for cleaning. In one embodiment of the invention, we disclose a parallel screen filter with isolation valves to remove and replace filter while system continues to operate.

In one embodiment of the invention, we disclose use of a single pump to drive filtration stages for centrifugal separator, screen filtration followed by ultra-filters while measuring the pressure differential across each stages to monitor pressure loss across each stages. This invention simplifies the filtration pump hardware requirement with properly design pump capacity.

As discussed above, the ultrafiltration and microfiltration membranes come in two types of geometries, inside-out and outside-in filtration. In addition to two geometries, several membrane material compositions such as PVDF, PAN and PES and require very different operation parameters, such as flux or flow rates, trans-membrane pressures (TMPs), filtration direction (inside lumen or outside lumen), back flush directions, the configurations can vary significantly and can be very dependent on system design. In one embodiment of the invention, we disclose a process flow that is able to incorporate various flow-directions, varying back-flush requirements and membrane specific operating parameters.

In another embodiment of the invention, we disclose the user selection driven operation of the various configurations using a common programmable logic controller and an operating interface.

An RO membrane is designed to rejects material as small as ions like $Na^+$ and $Cl^-$, thus enabling desalination of water. Typically, they are capable of rejecting more than 99% of the monovalent and divalent ions such as $Na^+$, $Cl^-$, $Ca^{++}$, $Mg^{++}$ and $SO_4^{--}$. Most RO membranes require pressure to filter water through them. This pressure requirement is directly related to the amount of salt concentrations (or total dissolved solids, TDS) for the water processed. Higher TDS requires higher feed pressure to overcome the osmotic pressure. Higher pressure means increased energy use by pumps to permeate water through RO membranes. Today, for seawater desalination, energy is a significant cost component and can be as high as 30% of the total cost to desalinate water. Seawater usually has TDS in the range of 3-4%, brackish water (underground) TDS can vary in the range 0.5-2% while surface water (rivers and lakes) TDS can be lower, in the range of 0.1-1%. For drinking purposes, TDS of less than 0.05% (500 ppm) is required and lower is always better. For desalination, it is necessary to optimize applied pressure for maximum permeate efficiency (ratio of permeate and feed). For seawater desalination, typical feed pressures can range from 600 to 1000 psi while achieving permeate efficiency in the range of 25-40%. For brackish water, the feed pressures typically range from 200 to 400 psi while achieving permeate efficiency in the range of 50-70%. Surface water desalination typically requires feed pressures in range of 100-200 psi and is able to achieve 60-80% efficiency. For most of these desalination scenarios, concentrate brine (the reject) can have salt concentration in the range of 4-5%, if processed already through a UF or MF pretreatment stage is quite clean of suspended particulates and mostly contains dissolved solids. In one embodiment of the invention, we disclose a temporary storage of the brine for use as backflush of the UF/MF membranes, thus increasing the overall efficiency of the MF/UF segment.

In another embodiment of the invention, we disclose the impact of such high salinity backflush on disruption of any bio-growth of bacteria due to increased salinity.

A system process flow diagram is included below for reference covering the various inventive steps and processes discussed above. A combination of several 2-way (open/close state) valves (FIG. 2) provides the required control of the process for various UF/MF membranes. Additional valves provide use of intermediate holding tanks for various processes involved for maintenance of the UF/MF filters. In one embodiment of the invention, a common pump is used for multiple purposes such as MF/UF backflush, MF/UF clean-in-place, RO-flush, and RO clean-in-place.

What is claimed is:

1. A novel desalination system comprising:
   i. a first-stage pre-filtration segment and a second-stage microfiltration or ultrafiltration (MF/UF) segment, the first stage pre-filtration segment hydraulically coupled to the second-stage MF/UF segment, a first built-in buffer tank and a third-stage reverse osmosis (RO) membrane segment following the second-stage MF/UF segment, the first built-in buffer tank hydraulically coupled to the third-stage RO segment, a second built-in buffer tank following the third-stage RO segment, the second built-in buffer tank hydraulically coupled to the second-stage MF/UF segment and to the third-stage RO segment, and a programmable logic controller;
   ii. the second-stage MF/UF segment comprises a membrane bank, wherein the membrane bank is an inside-out membrane bank, an outside-in membrane bank, or a cross-flow membrane bank, wherein the inside-out membrane bank, the outside-in membrane bank, and the cross-flow membrane bank are interchangeable within the second-stage MF/UF segment;
   iii. the first built-in buffer tank stores MF/UF filtered water and the second built-in buffer tank stores RO concentrate, wherein the first built-in buffer tank has a volume capacity to feed the third-stage RO segment without interruptions when the second-stage MF/UF segment goes through a backflush process, wherein the second built-in buffer tank has a volume capacity to backflush the second-stage MF/UF segment;
   iv. the first built-in buffer tank is hydraulically coupled to the second built-in buffer tank;
   v. the first-stage pre-filtration segment comprises a sequential combination of a centrifugal separator followed by a screen filter component in order to remove settleable and suspended particles;
   vi. a single pump drives the first-stage pre-filtration segment and the second-stage MF/UF segment with intra-stage differential pressure measurement across the centrifugal separator, the screen filter component and the second-stage MF/UF segment;
   vii. the screen filter component in part (v) has two parallel screen filters with 3-way isolation valves to replace one of the two parallel screen filters without interrupting system operation.

2. The novel desalination system of claim 1, further comprising a plurality of two-way valves, wherein, the programmable logic controller controls the plurality of two-way valves for process control of the inside-out membrane bank, the outside-in membrane bank, or the cross-flow membrane bank within the second-stage MF/UF segment.

3. The novel desalination system of claim 2, further comprising an operating interface in communication with the programmable logic controller for selecting a membrane specific process flow through the plurality of two-way valves for the second-stage MF/UF segment.

4. The novel desalination system of claim 1, wherein, a pump drives backflush, clean-in-place of the second-stage MF/UF segment, wherein the pump further drives flush and clean-in-place of the third-stage RO segment.

5. The novel desalination system of claim 1, wherein the second built-in buffer tank is used for backflush and clean-in place of the second-stage MF/UF segment, wherein the second built-in buffer tank is further used for flush and clean-in-place of the third-stage RO segment.

6. The novel desalination system of claim 1, wherein backflush of the second-stage MF/UF segment with RO concentrate produces a high salinity surge in the third-stage RO segment causing disruption of bacterial growth and reduction in biological fouling.

7. The novel desalination system of claim 6, wherein the high salinity surge in the third-stage RO segment produces a reverse permeate flow to effect removal of scalants and foulants from a membrane surface of the third-stage RO segment and to effect reduced long-term fouling.

* * * * *